Figure 1:
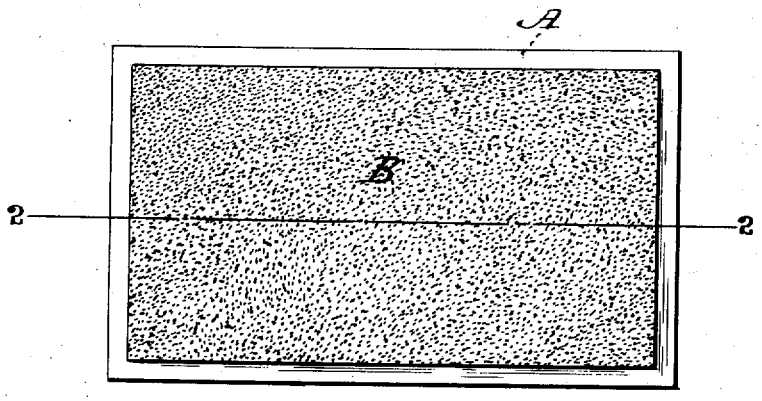

HOKE ENGRAVING PLATE COMPANY.

RELIEF TYPE PRODUCTION.

No. 11,363. Reissued Sept. 5, 1893.

WITNESSES:

Edward W. Turrell

Edward F. Goltra

INVENTOR:

Hoke Engraving Plate Co.

by C. N. Moody its atty

UNITED STATES PATENT OFFICE.

THE HOKE ENGRAVING PLATE COMPANY, OF ST. LOUIS, MISSOURI, ASSIGNEE, BY MESNE ASSIGNMENTS, FROM JOSEPH W. HOKE, DECEASED, LATE OF SAME PLACE.

RELIEF-TYPE PRODUCTION.

SPECIFICATION forming part of Reissued Letters Patent No. 11,363, dated September 5, 1893.

Original No. 388,361, dated August 21, 1888. Application for reissue filed August 7, 1893. Serial No. 482,631.

*To all whom it may concern:*

Be it known that JOSEPH W. HOKE, deceased, formerly a resident of St. Louis, Missouri, made a new and useful Improvement in Relief-Type Production, of which the following is a full, clear, and exact description.

Relief types of the class to which the present improvement relates are cast, molded, electrotyped, or prepared in a matrix formed out of a composite engraving plate consisting of a base plate having a plane, smooth, hard surface, to which is applied a coating that is softer than the base plate and of pulverizable material which can be readily scored and engraved by means of a graver and which crumbles under the graver, and the matrix is formed by engraving the design of the desired type in the coating, the lines engraved being extended through the coating to the base plate beneath. From such engraved matrices stereotypes were cast directly as early as the latter part of the last century. A coated plate, to be used as a matrix when engraved, was patented by Hoffman, in France, in 1792. Like his successors, Hoffman used a comparatively soft coating upon a hard base plate, the thickness of the coating regulating the relief and the base plate equalizing the depth of the engraved lines. Palmer, Joyce, and others in Europe and this country have substantially followed Hoffman but all have failed to produce a satisfactory engraving plate for the purpose described. The various coatings which have been devised are objectionable for many reasons, and especially because the particles of the coating cohere more to each other than to the base plate, and in consequence the coating, when cut with the graver, scales from the base plate and chips, so that it is impracticable to form the cuts closely together, or to cross them or to do any but the coarsest work with the plates.

To obviate this difficulty, as well as to provide an engraving plate having other superior qualities, is the aim of this improvement.

The base plate of such improved engraving plate for stereotyping purposes is preferably a polished blued steel plate of suitable superficies. It withstands the heat incident to stereotyping, and its tint, when a light colored coating is used, presents a marked and agreeable contrast to the coating and enables the engraver to readily judge the effect of his work. For electrotyping purposes a base-plate of glass is preferred. Glass is also an excellent material in combination with the special coating preferred and hereinafter described, and its transparency enables the engraver to examine his work by holding the plate to the light.

For the coating of the plate a finely-powdered material such as a finely-powdered earth or mixture of earths or other equivalent finely powered inorganic substance or substances which will withstand the heat of molten stereotyping metal is used. The more thoroughly and evenly the material is comminuted and the more marked the contrast in color between the coating and the base-plate the better is the engraving plate adapted for the purpose in view.

The leading features of the improvement are, that the particles of the coating next to the base plate adhere thereto more strongly than the particles above them adhere either to them or to each other, and that the coating is very friable and the particles thereof very loosely as well as very evenly bonded together, so that they readily separate without caking and without breaking away between the lines when the plate is engraved; bonding the particles of the coating to each other and to the base plate with soluble glass or an equivalent soluble mineral alkaline bond; bonding the particles of the coating to each other and to the base-plate by treating the particles with a solution of soluble glass or equivalent soluble mineral alkaline solution, and then baking the coated base-plate until the coating is dried; mixing together the ingredients to be bonded, then adding a water-glass in solution or an equivalent solution of a soluble mineral alkaline substance, and then baking or subjecting a base plate coated with the mixture to a heat beneath the boiling point and not under 100° Fahrenheit until the coating is solidified, after which the heat may be increased without injury to the coating; the special combination of substances given in the formula and used to form the coating upon the base plate.

The annexed drawings, making part of this specification, exhibit an engraving plate of the kind under consideration.

Figure 2:
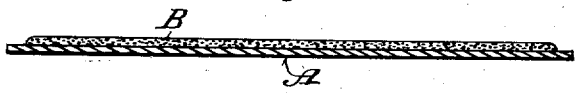

Figure 1 is a plan view. Fig. 2 is a longitudinal section of Fig. 1 on line 2—2.

A represents the base-plate, and B represents the coating.

The same letters of reference denote the same parts.

In engraving a design in the matrix it is highly desirable that the engraver shall be able to see distinctly the lines made through the coating, and thereby judge correctly the work being done. To this end the coating is made white or light colored, while the surface of the base plate appears dark, and the end is more effectually attained by employing a blued steel plate for the base plate.

The production of a perfect type requires corresponding perfection in the matrix in which the type is cast or otherwise prepared. A plane, smooth, polished metallic plate, A, presents the surface required for the face of the type. To obtain a sufficient counter for the type, the coating B must be of corresponding thickness, and to make smooth fine lines, to make lines close together, and to cross the lines the coating must not break away between the lines nor where they cross each other. It is also desirable to minimize the resistance to the point of the graver as it is moved through the coating. It is also desirable for the coating to be very even and homegeneous, so that whether slightly harder or slightly softer it shall offer uniform resistance to the graver. It is not only essential that the coating withstand the heat of stereotyping or the acid in electrotyping, but it is also very desirable that it resist the action of the water or of the atmosphere, so that, whether recently made or for some time on hand, it shall be capable of use, and the merchantable qualities of the plate are enhanced if it is light, portable, and cheap. All these requisites, and most of them notably, are attained with the improved coating, whose most desirable constitution is stated in the following formula: Of sulphate of barium, (barytes) take two drams; of silicate of magnesia, (French chalk,) take one dram; of silicate of soda, take four drops; and of water, take five cubic centimeters. This mixture will cover sufficiently thick six square inches of plate. The more perfectly it is mixed the better the plate. A good way to make the mixture is first to mix the earth or earths in a finely-pulverized form with water and work and rub the ingredients in a mortar until the mixture becomes smooth, and then add the solution of soluble glass and mix it with the other ingredients as thoroughly as practicable. The mixture should then be spread evenly over the base plate, shaking it slightly to settle the coating evenly. The coating should, after being placed on the plate, be dried by heat beneath the boiling point and not lower than 100° Fahrenheit, and preferably between 180° and 190° Fahrenheit, until it solidifies, after which the heat may be increased as high as 300° Fahrenheit without injury to the coating. The object in keeping the heat beneath the boiling-point while the coating remains in a semi-liquid state is to prevent its boiling. The coating should be thoroughly dried. The coating at its top is usually incrusted, and after the plate has cooled and before it is engraved the crust should be scraped off and the coating made of a uniform depth over the surface of the base-plate.

When the coating is mixed very slowly, it may be baked at once; but otherwise it should be allowed to stand after mixing for at least five minutes before baking, and is rather improved by being allowed to stand longer. The object in allowing it to stand before baking is to allow the air contained in the mixture to escape as far as possible and to prevent the coating from curling up and cracking while being dried.

The above method of mixing and baking is not the only one that can be used. The essential points are first to introduce the bond in the form of a solution into the body of the coating, and then dry the coating upon the plate.

Instead of mixing the bond with the water and earths in the manner above described, the mixture may be made without the bond and dried, with or without artificial heat, upon the base-plate, and the coating may then be saturated with a solution of silicate of soda containing from twenty five to fifty drops of silicate of soda to an ounce of water, and then baked as first above directed. In this process it is preferred to use twenty five drops of the silicate of soda to an ounce of water.

Though the formula for the coating above given is considered the best, it may be widely departed from and good results still obtained, so long as the bond is of the proper nature and is used in the proper proportion. It is preferable to use the earths named in the formula (silicate of magnesia and sulphate of barium) and in the proportions given; but the proportions may be varied indefinitely and good, though inferior, plates made. Either silicate of magnesia or sulphate of barium may be used alone in place of the mixture, though not so good. Sulphate of barium is somewhat undesirable when used alone, because a coating made of it has a tendency to crack in drying.

The following substances are unsuitable as substitutes for sulphate of barium and silicate of magnesia, viz: first, all soluble salts; second, alkalies, including earthy alkalies or alkaline earths; and, third, all substances incapable of withstanding the heat of molten type-metal in stereotyping. All other solid inorganic substances which can be reduced to a fine powder, except the metals, are called earths," and wherever the word "earth" or "earthy" is used in this specification it should be understood in that sense and subject to the above limitations. Among the substances called "earths" is silica, sometimes called an "acid," but for the purposes of this invention it has all the qualities of an earth, and the silicious rocks are found especially valuable.

All kinds of light-colored earth may, when finely powdered, be used in lieu of the ones named in the above formula, though they are far from being equally good. Those which have the least attraction for water are the best. The clays are perhaps the least desirable of all, because of their tendency to crack when drying. It is desirable where they are used to mix them with an equal bulk of plaster-of-paris or with some other substance which will prevent cracks, as the bond will not perform that function when used in the proper proportion.

The most desirable earths—naming them in their order of merit—are, in the opinion of the inventor the following: soapstone, tripoli, talc, quartz, and chalk. They may be used singly or in combination with each other or other white earths not named. Sulphate of barium, though excellent when mixed with silicate of magnesia, is not so good as the substances named above when used singly. The best results have been obtained by mixing a very light with a very heavy earth and that is considered a very good course to follow. The specific gravity of a mixture of sulphate of barium and silicate of magnesia in the proportions named in the formula given is considered the most desirable, and in selecting an earth or making a mixture of earths an attempt to approximate the same specific gravity should be made.

The proportions of silicate of soda and water which are preferable to use with the mixture of earths given in the formula have been given but both water and the bond may be used in different proportions, though the results will not be so good. From four (4) to six (6) cubic centimeters of water and from one to fourteen drops of silicate of soda may be used with the mixture of the earths given in the formula. Where, however, less than two drops of bond are used, the plate is very poor, because insufficiently bonded. Where more than eight drops are used, the coating is made too hard to be entirely satisfactory, and is more or less liable to break away from the base-plate when being engraved.

The silicate of soda used and which is taken as a standard in making out the formula given is the solution known commercially as "pure" silicate of soda. It is not necessary that it should be strictly chemically pure. It sometimes differs somewhat in density and purity from the usual standard; but it has not been known to differ enough to make the above formula and directions inapplicable.

What is commercially known as "pure" solution of silicate of potash, and which shares the name of "soluble glass" with "silicate of soda," is a strict chemical equivalent of silicate of soda, and may be substituted for it and the same proportions used where the solution is of the same specific gravity as the pure solution of silicate of soda. There are also other soluble alkaline mineral equivalents of silicate of soda, as it is well known.

The following rule may be taken as a guide in using the bond and water with other earths or mixture of earths than the mixture prescribed in the given formula: The amount of bond and water used should be the same as for an equal bulk of the mixture of earths given in the formula. This rule is not exact, because the chemical character of the different earths varies; but it will answer for practical purposes. Another test as to the amount of water to be used is that the mixture when made should be thin enough to pour out of a containing vessel, but no thinner than necessary for that purpose. It should be of about the consistency of batter, so that a small portion will cling to the side of the vessel from which it is poured. Clay is an exception to the general rule as to the amount of water necessary. Where it is used, only one half the quantity of water necessary for other substances should be used.

Where more water than is directed to be used is used, the earths settle to the bottom and the larger portion of the bond remains on top, so that there is an insufficient amount of bond near the base-plate unless an unnecessary amount of bond is used. The amount of bond directed to be used is what should be embodied in the coating.

It is not desired to be limited to any special composition or bond. The inventor was the first to discover the desirability of bonding the particles of the coating very loosely together and more strongly to the base plate than to each other, as well as a method of accomplishing that end. There are well-known chemical equivalents of soluble glass, all of which may be used. Some are called "soluble glasses," though the term "soluble glass" is used in this specification as embracing within its meaning silicate of soda and silicate of potash in solution. It is desired to cover all equivalents. It is not intended to claim all modes of bonding those particles of the coating more strongly to the base plate than those particles above them are bonded either to them or to each other. But

What is claimed is—

1. As a new article of manufacture, an engraving plate having a base-plate with a smooth hard upper surface and a soft friable coating of minute particles of earthy matter wholly or in part soap stone, tripoli, talc, quartz, chalk, barium, or kaolin and bonded loosely together solely, in substance, by means of a soluble bond added to said earthy particles, and having those particles of the coating next to the base plate more strongly bonded to it than the particles above them are bonded either to them or to each other.

2. As a new article of manufacture, an engraving plate having a base-plate with a smooth hard upper surface and a soft friable coating of minute particles of earthy matter wholly or in part soap stone, tripoli, talc, quartz, chalk, barium, or kaolin and bonded loosely together solely, in substance, by means of a soluble mineral bond added to said earthy particles, and having those particles of the coating next to the base-plate more strongly bonded to it than the particles above them are bonded either to them or to each other.

3. As a new article of manufacture, an engraving plate having a soft, friable coating composed of minute earthy particles bonded together and to a base plate having a smooth, hard upper surface by soluble glass, for the purposes set forth.

4. In combination with a base plate having a smooth, hard upper surface, a coating composed of soluble glass, silicate of magnesia, and sulphate of barium, in substantially the proportions herein recommended, as and for the purposes described.

5. In combination with a base plate having a smooth, hard, upper surface of soluble glass and a mixture of pulverized earths of different specific gravities, as and for the purposes described.

6. The hereindescribed process of making an engraving plate having a coating bonded by a soluble glass, consisting in introducing the bond in solution into contact with all the particles of the coating and then drying the coating by heat, substantially as directed.

7. The herein described process of making and finishing an engraving plate having its coating bonded by a soluble glass, consisting in reducing the earthy matter used to a fine powder, and subsequently introducing the bond in solution into contact with all the earthy particles of the coating, drying the coating on a base-plate by heat, and finally removing the crust, all substantially as herein directed.

Witness the hand of said corporation this 29th day of July, 1893.

HOKE ENGRAVING PLATE CO.,
By CHAS. H. HOKE,
*Vice and Acting President.*

Witnesses:
C. D. MOODY,
WILLIAM E. HOKE.